(12) United States Patent
Rizzi et al.

(10) Patent No.: US 8,460,614 B2
(45) Date of Patent: Jun. 11, 2013

(54) HEAT EXCHANGER WITH RADIALLY ARRANGED ELEMENTS FOR ISOTHERMAL CHEMICAL REACTORS

(75) Inventors: Enrico Rizzi, Casnate con Bernate (IT); Ermanno Filippi, Castagnola (CH); Mirco Tarozzo, Ligornetto (CH); Luca Redaelli, Drezzo (IT)

(73) Assignee: Methanol Casale S.A. (CH)

( * ) Notice: Subject to any disclaimer, the term of this patent is extended or adjusted under 35 U.S.C. 154(b) by 11 days.

(21) Appl. No.: 13/120,355

(22) PCT Filed: Aug. 12, 2009

(86) PCT No.: PCT/EP2009/060427
§ 371 (c)(1),
(2), (4) Date: Mar. 22, 2011

(87) PCT Pub. No.: WO2010/034564
PCT Pub. Date: Apr. 1, 2010

(65) Prior Publication Data
US 2011/0186278 A1 Aug. 4, 2011

(30) Foreign Application Priority Data
Sep. 23, 2008 (EP) .................................. 08016687

(51) Int. Cl.
| B01J 19/00 | (2006.01) |
| B01J 8/00 | (2006.01) |
| F28D 7/00 | (2006.01) |
| F28F 1/10 | (2006.01) |
| F28F 9/02 | (2006.01) |
| F28F 1/00 | (2006.01) |
| F28F 9/04 | (2006.01) |
| F28F 1/20 | (2006.01) |
| F28F 1/14 | (2006.01) |

(52) U.S. Cl.
USPC ........... 422/198; 422/129; 422/187; 422/200; 422/201; 165/172; 165/173; 165/177; 165/178; 165/181; 165/183

(58) Field of Classification Search
USPC .......... 422/129, 198, 200, 201, 187; 165/172, 165/173, 177, 178, 181, 183
See application file for complete search history.

(56) References Cited

U.S. PATENT DOCUMENTS

| 3,364,951 A | 1/1968 | Burne et al. |
| 3,964,873 A * | 6/1976 | Aramaki et al. .............. 422/201 |

(Continued)

FOREIGN PATENT DOCUMENTS

| EP | 1705445 A1 | 9/2006 |
| EP | 1284813 B1 | 8/2007 |

(Continued)

*Primary Examiner* — Jill Warden
*Assistant Examiner* — Natasha Young
(74) *Attorney, Agent, or Firm* — Akerman Senterfitt

(57) ABSTRACT

An isothermal chemical reactor (1) comprising an array of radially arranged plate-like heat exchange elements (11) inside a reaction space, each element comprising feeding and collecting ducts and a bundle of parallel tubes (15) defining channels (12) for a heat exchange medium, the tubes (15) having an elongated cross section and being disposed with a variable orientation relative to the radial direction of the reactor, so that inner tubes near the axis of the reactor have the cross-section major axis aligned with said radial direction, and outer tubes have the same axis perpendicular to the radial direction. The preferred structure of a plate-like heat exchange element is also disclosed.

11 Claims, 5 Drawing Sheets

U.S. PATENT DOCUMENTS

| | | |
|---|---|---|
| 6,388,362 B1 | 5/2002 | Suzuki et al. |
| 6,623,707 B1 | 9/2003 | Addiego et al. |
| 2004/0071606 A1 | 4/2004 | Filippi et al. |
| 2006/0275190 A1* | 12/2006 | Filippi ............ 422/200 |
| 2008/0145285 A1 | 6/2008 | Olbert et al. |
| 2008/0292517 A1 | 11/2008 | Filippi et al. |
| 2009/0145589 A1 | 6/2009 | Filippi et al. |

FOREIGN PATENT DOCUMENTS

| | | |
|---|---|---|
| EP | 1854534 A1 * | 11/2007 |
| WO | WO 2005/005040 A1 * | 1/2005 |

* cited by examiner

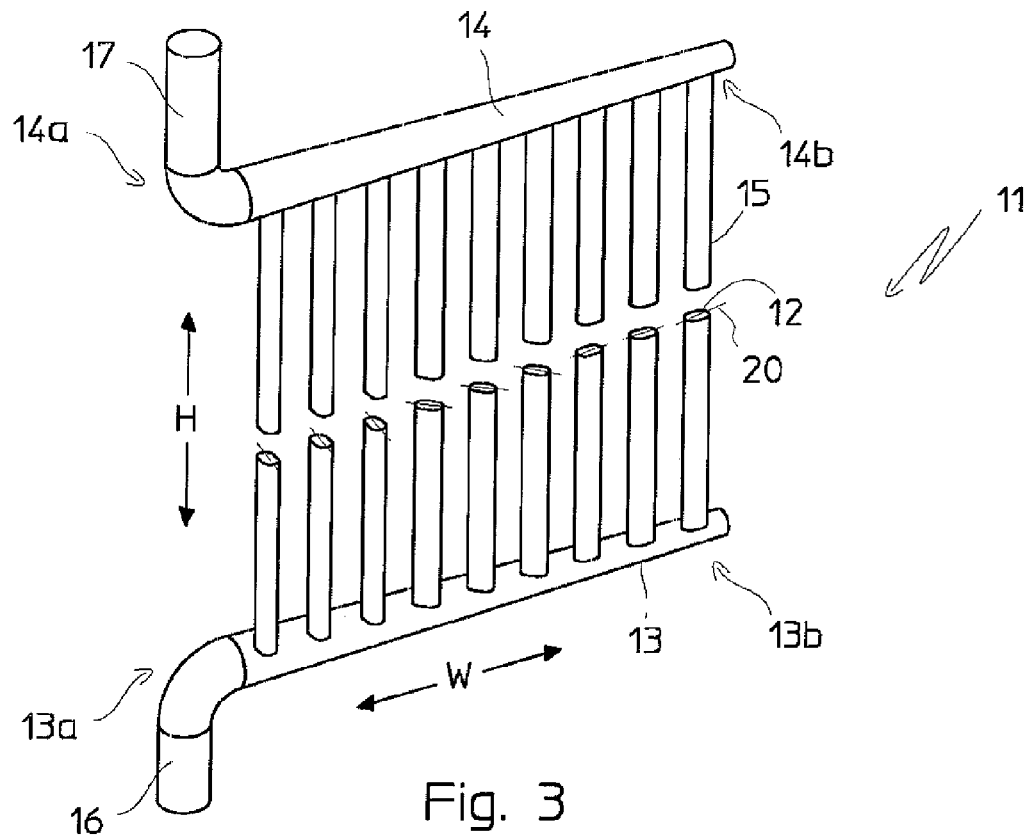
Fig. 3
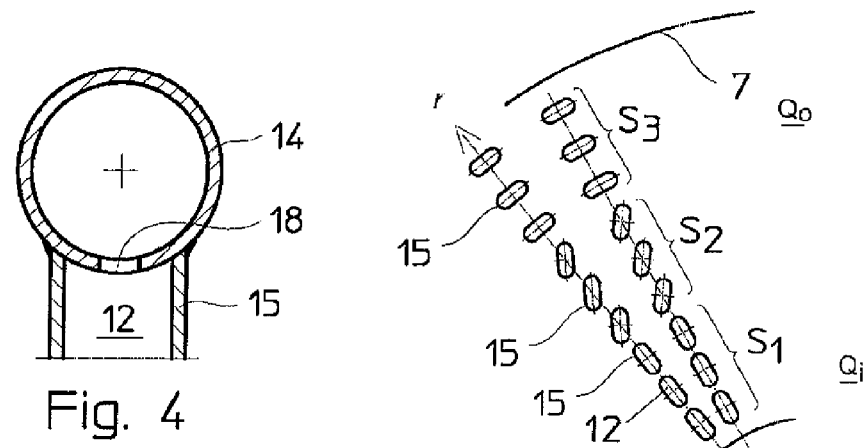
Fig. 4
Fig. 6
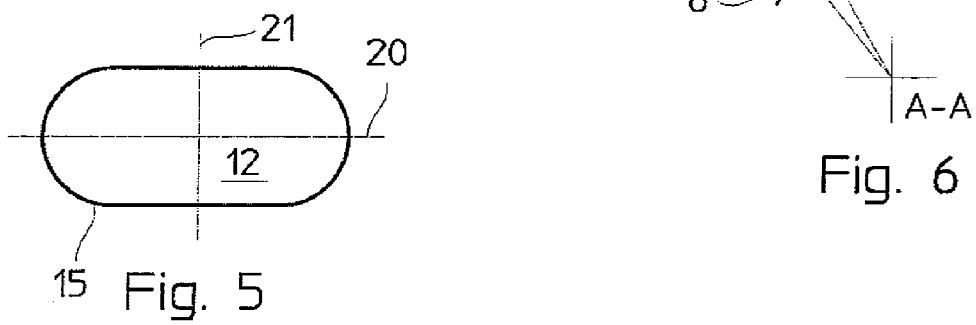
Fig. 5

HEAT EXCHANGER WITH RADIALLY ARRANGED ELEMENTS FOR ISOTHERMAL CHEMICAL REACTORS

FIELD OF THE INVENTION

The invention relates to a novel heat exchanger suitable for use in isothermal or pseudo-isothermal chemical reactors. The invention relates, more in detail, to the heat exchanger, the heat exchange element thereof, and the reactor equipped with the heat exchanger.

PRIOR ART

Isothermal or pseudo-isothermal chemical reactors are reactors equipped with an internal heat exchanger to control the temperature of the reaction zone. In operation, the heat exchanger is fed with an appropriate cooling or heating medium, such as water, steam, etc. . . . and compensates for the heat generated or absorbed by the evolving chemical reaction, respectively exothermic or endothermic. Usually, the heat exchanger is immersed in a catalytic bed. Examples of such reactors are the methanol synthesis reactors and the shift converters, where a synthesis gas containing carbon monoxide is treated to convert the carbon monoxide into carbon dioxide.

The known isothermal reactors can be equipped with a tube heat exchanger or a plate heat exchanger. The reactor is correspondingly referred to as tube- or plate isothermal reactor.

Conventional tube isothermal reactors comprise heat exchange elements in the form of tube bundles supported by opposite tube sheets. Plate isothermal reactors have heat exchange elements in the form of plates formed by parallel walls connected with each other at least along the perimeter, so to define an internal passage for the heat exchange medium.

A plate isothermal reactor is disclosed in EP-A-1284813. A particularly advantageous plate heat exchanger for use in chemical reactors is disclosed in EP-A-1705445, comprising so-called "swelled" plates formed by two flat metal sheets joined by a perimeter welding and possibly by other welding points, and subjected to a high-pressure hydraulic swelling to create fluid passages between the two sheets.

Plate isothermal reactors are generally preferred to tube reactors, because of advantages such as the large exchange surface compared to size. Installation and maintenance are made easier by the possible modular structure, where the exchanger is made of modules comprising a certain number of plates, and each module can be inserted or removed through a relatively small manhole. Tubes, on the other hand, require tube sheets as large as the shell of the reactor, meaning that the reactor must have an upper and a lower flange having about the same diameter of the shell. Large flanges are more expensive and may pose problems of tightness; moreover, substitution or extraction for maintenance of a portion of a tube heat exchanger is generally not possible.

In axial-flow or radial-flow reactors, the reaction space is usually an annular space between an inner diameter and an outer diameter, corresponding to inlet/outlet of the catalytic bed. The internal plate heat exchanger is then formed as a substantially annular unit, with radial plates having converging ends towards the axis of the reactor, and opposite diverging ends near the external shell of the reactor. This arrangement has several advantageous features, including optimal exploitation of the available volume inside the reactor.

There is a continuous incentive to increase the duty of such chemical reactors, to increase the production rate. The heat exchanger is then required to exchange a remarkable thermal power and to provide accurate control of the temperature of reaction, throughout the whole reaction zone. This is more challenging at the inlet of the fresh and highly reactive charge, where the thermal power of the reaction is greater, and in the outer region of the reaction zone (radial-inward flow), where the heat exchange elements are relatively distant from each other, due to their radial arrangement.

SUMMARY OF THE INVENTION

In a chemical reactor comprising a cylindrical shell and an array of radially-arranged heat exchange elements disposed in an annular reaction space, the technical problem faced by the invention is to modify the structure of the heat exchange elements in order to achieve the best exploitation of the available heat exchange surface, especially at the outer region of the reaction space where the radial elements diverge.

The invention provides an isothermal chemical reactor comprising a substantially cylindrical shell and a substantially annular reaction space, the reactor comprising a heat exchanger disposed in said reaction space and comprising an array of radially-arranged heat exchange elements around a central axis of the reactor, where each of said heat exchange elements is extended in a radial direction through said reaction space, and each of the heat exchange elements comprises a plurality of channels for a heating or cooling fluid, the channels being substantially parallel to said axis of the reactor, characterised in that:

said channels have an elongated cross section with a major axis and a minor axis on a plane perpendicular to said axis of the reactor;

each of said heat exchange elements has at least a first subset of channel(s) located in an inner region of the reaction space and arranged with the major axis forming a first angle greater or equal to 0° with said radial direction, and at least a second subset of channel(s) located in an outer region of the reaction space and arranged with the major axis forming a second angle with said radial direction, said second angle being greater than said first angle.

A subset of channel(s), in accordance with this specification, comprises one or more consecutive channels of the respective heat exchange element. The term heat exchange element is shortened as HX element. The inner region of the reaction space is intended as the annular part of said space which is closer to the axis of the reactor, while the outer region is intended as the annular part lying closer to the shell.

Said first angle is a small angle, preferably in the range 0 to 15° and more preferably equal to 0°, i.e. the inner channels are preferably disposed with the major axis of their cross section being parallel to the radial direction inside the reactor.

Said second angle is preferably less than or equal to 90°. In preferred embodiments, said second angle is in the range of 30° to 90°, and preferably equal or close to 90°.

In a more preferred embodiment, each HX element comprises at least one intermediate subset(s) of channel(s) between said first subset and said at least one second subset, and the channels of the intermediate subset(s) of channels are disposed with the major axis of the cross section forming an intermediate angle in the range between said first angle and second angle. In different embodiments, one or more of said intermediate subset(s) can be provided.

In a particular embodiment, each of the HX elements comprises a first subset of inner channels with the cross-section major axis parallel to the radial direction, at least a second subset of intermediate channels with the major axis at 30 to 60°, preferably 45°, and another subset of outer channels with the major axis at 90°, perpendicular to the radius of the reactor.

In a preferred mode of realization, the channels of the heat exchange elements are formed by tubes having an appropriate cross section.

According to another aspect of the invention, each HX element is formed as a plate-like element comprising: a feeding duct and an opposite collecting duct for the heat exchange medium, said ducts forming an upper side and a lower side of the HX element, and a bundle of parallel tubes having the opposite ends in fluid communication with the feeding duct and the collecting duct, respectively.

Preferably, the feeding duct and the collecting duct have a variable cross section, decreasing along the HX element, in the radial direction of the reactor, from the outer side to the inner side of the HX element itself. A preferred embodiment provides conical pipes to realize said ducts.

In accordance to still another aspect of the invention, said feeding duct and said collecting duct have a substantially triangular or trapezoidal shape with a wider portion at the outer end, near the shell of the reactor, providing more room for the channels of the heat exchange medium. For example, two or more tubes can be supported side by side by the wider portion of the feeding and collecting ducts, increasing the available heat exchange surface at the outer region of the reaction space. In practical terms, said ducts can be realized as segments of a tube sheet.

In all the above embodiments, the elongated cross section of the tubes and channels can be for example elliptical or polygonal, e.g. in the form of an elongated hexagon, or other.

Thanks to the elongated cross section of the tubes and channels, in combination with the variable angle between the major axis of the channels and the radial direction, the heat exchange surface is distributed in a more efficient way if compared with conventional plate or tube units. In particular, the elongated tubes perpendicular to the radius can better fill the reaction space in the outer zone, where the elements tend to diverge from each other; the elongate tubes parallel to the radius, near the axis, allow to reduce the distance between the elements, that is to provide more HX elements, without incurring in physical interference of their converging ends.

The conical feeding and collecting pipes, in accordance with one of the aspects of the invention, are also advantageous in terms of reduced transversal dimension of the heat exchange elements at the converging ends, where less room is available.

The heat exchange elements according to the invention operate substantially as plates, hence keeping all the above discussed advantages of the plate heat exchangers. Pipes connections for the plate-like elements are the same as for conventional plates. Further to this, the inventive heat exchanger can provide more heat exchange elements and/or more heat exchange surface in a given reaction space, and in comparison to a conventional plate heat exchanger in radial arrangement.

Summarizing, the inventive HX element has variable orientation of the fluid channels and acts as a plate with a variable width. Related advantages are a better control of the reaction, reducing any risk of local overheating of the catalytic bed, especially between the relatively distant outer portions of the plates, and prolonging the life of the catalyst.

An object of the invention is also a plate-like heat exchange element, having an overall width and height, and comprising at least a feeding duct and a collecting duct for a heat exchange medium, said ducts being disposed in the width direction of the element, and a plurality of tubes defining channels for a heat exchange medium, the tubes extending in the height direction and having opposite ends in fluid communication with the feeding duct and collecting duct respectively, characterised in that:

said channels have an elongated cross section with a major axis and a minor axis;

the heat exchange elements comprises at least a first subset of channel(s) arranged with the major axis forming a first angle between 0 and 90 degrees with said width direction, and at least another subset of channel(s) arranged with the major axis forming a second and greater angle with said width direction.

The above disclosed preferred embodiments are equally applicable to said plate-like element.

The applicant has found that this structure of plate-like heat exchange element is advantageous also for the easy and economic realization, and the inventive plate-like element may successfully replace the conventional plates formed by welding of metal sheets.

Hence, a further aspect of the invention is a plate-like heat exchange element, having an overall width and height and comprising a feeding pipe and a collecting pipe for a heat exchange medium, said pipes forming a top and bottom side of the element and having a cross section decreasing along said width direction, from a side of the plate-like element to the opposite side thereof, and a plurality of tubes for a heat exchange medium, the tubes being supported between said feeding pipe and collecting pipe, aligned in said width direction of the element and having opposite ends fixed to and in fluid communication with the feeding pipe and collecting pipe respectively.

This plate-like element acts substantially as a conventional plate formed by parallel metal sheets welded together, but has the advantage of a low cost, especially in comparison with the swelled plates. The plate-like element requires less weldings, in practice only at the ends of tubes, and does not require the high-pressure swelling.

Said tubes act substantially as the channels of a heat-exchange plate, but provides the advantage that the reactants can circulate also around the tubes, i.e. more heat exchange surface is made available compared to size of the heat exchanger. It should also be noted that the plate-like elements do not require the large tube sheet of a tube heat exchanger.

The features and advantages of the present invention will be more evident from the following description of preferred indicative and non-limiting embodiments, with reference to the attached figures.

BRIEF DESCRIPTION OF THE FIGURES

FIG. 3 is a simplified view of one of the upper and lower side of one of the heat exchange elements of the reactor of FIG. 1.

FIG. 4 is a sectional view showing a detail of the element of FIG. 3.

FIG. 5 is a cross section of one of the tubes of the element of FIG. 3, in a preferred embodiment.

FIG. 6 shows the arrangement of the tubes of the heat exchange elements in the reactor of FIG. 1.

DETAILED DESCRIPTION OF A PREFERRED EMBODIMENT

Figure 1:
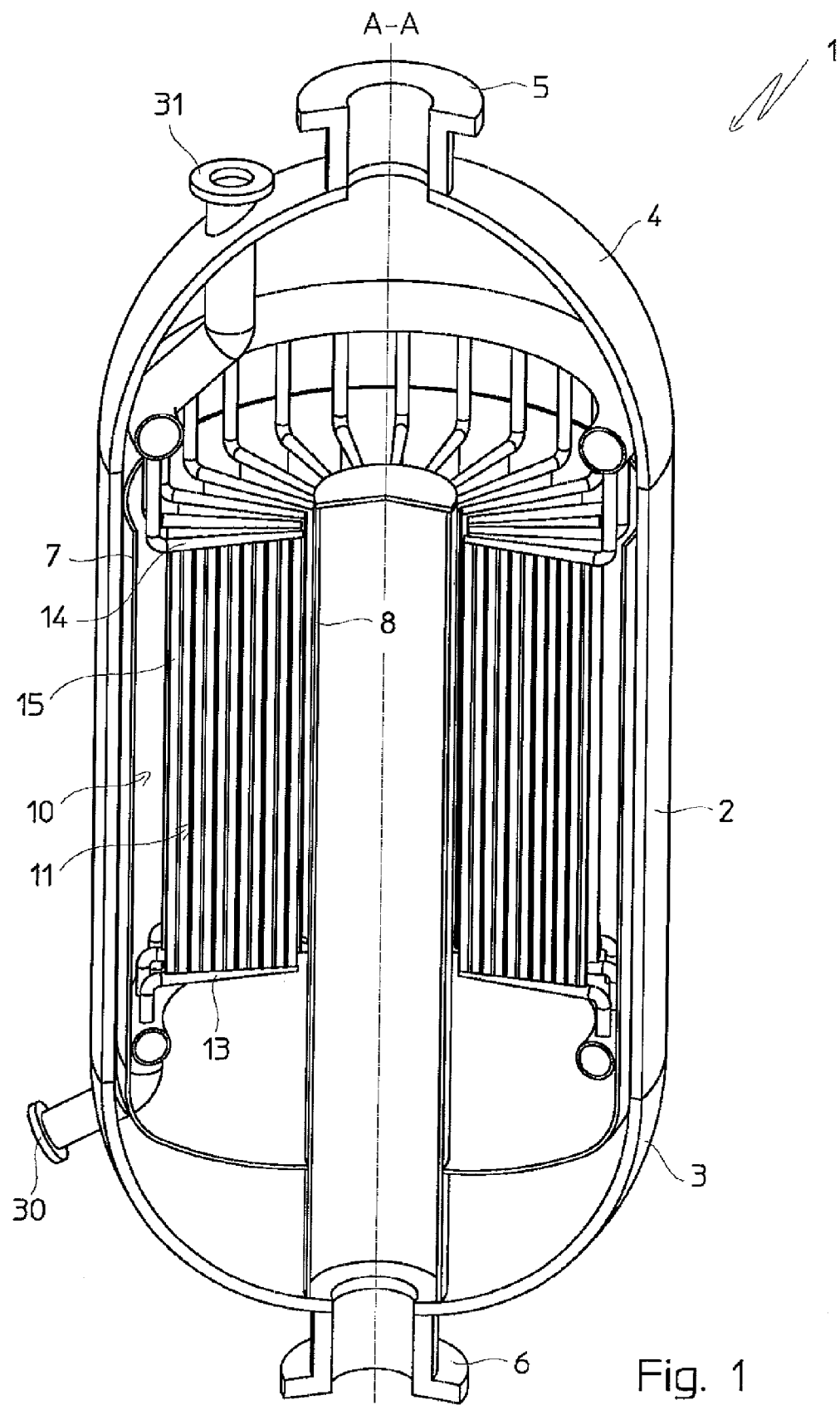
FIG. 1 is a schematic cut-out view of an isothermal chemical reactor according to the invention.

With reference to FIG. 1, an isothermal chemical reactor 1 comprises a cylindrical shell 2, with vertical axis A-A, a lower end 3 and an upper end 4, respectively equipped with an inlet flange 5 for the fresh charge of reagents and an outlet flange 6 for the products of the chemical reaction.

The example of FIG. 1 refers to a catalytic reactor, for example a methanol converter for the synthesis of methanol.

The reactor 1 contains an annular catalytic rack, which is per se known and not described in detail, containing an appropriate catalyst and externally delimited by a cylindrical perforated wall 7. The fresh charge of reagents enters from an interspace, between said wall 7 and the shell 2, flowing in a radial direction through the catalytic rack; the products of the reaction are collected in a central duct 8 in communication with the outlet flange 6.

Figure 2:
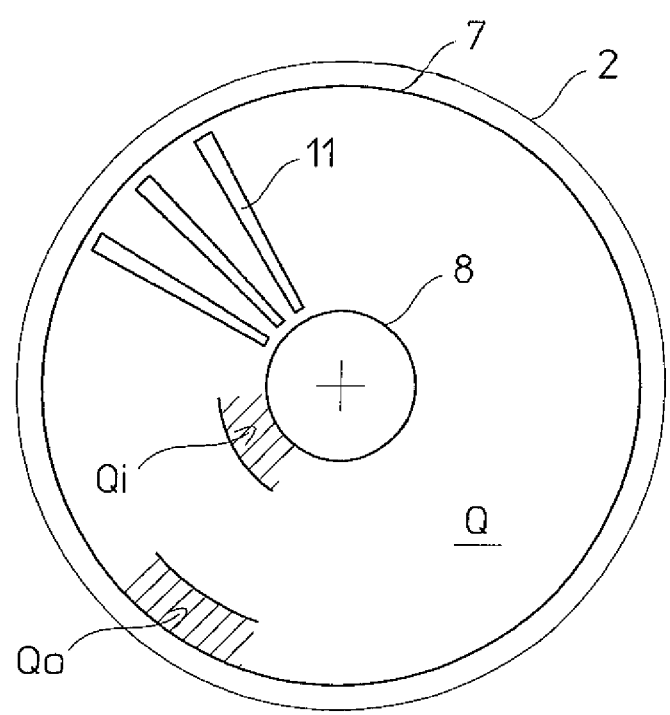
FIG. 2 is a schematic cross section of the reactor of FIG. 1.

The reaction takes place in the annular reaction space Q defined by the catalytic rack, between the wall 7 and the duct 8, where the reagents are converted into products (FIG. 2); in a specific embodiment, the reaction takes place while the reagents are flowing radially through the catalyst from the outer region Qo to the inner region Qi.

An axial-flow heat exchanger 10 is mounted in the reactor 1 and inside the reaction space Q, immersed in the catalyst. The heat exchanger 10 has an annular structure, with an array of radially-arranged heat exchange elements 11 around the axis A-A. Each of said elements 11 extends in the radial direction from an inner end in the inner region Qi of the reaction space Q, near the axis A-A, to an outer end in the outer region Qo the reaction space Q, close to the perforated wall 7 and to the shell 2.

Each of the HX elements 11 comprises a plurality of channels 12 for a heat-exchange medium. In the example, water is fed at flange 30 and steam is discharged at flange 31, but any other suitable heating or cooling medium may be used.

In a preferred embodiment (FIG. 3), each HX element 11 comprises an inlet duct 13 and an outlet duct 14, forming opposite sides of the element 11 itself, and a bundle of parallel tubes 15, forming said channels 12. FIG. 3 is not in scale and only shows the upper and lower ends of the element, as height H of the element is usually much greater than width W, e.g. H is 10-12 meters and W is around 1 meter or less. A number of reinforcing bars (not shown) are distributed at suitable intervals along H, to prevent tube vibrations.

The HX element 11 operates substantially as a heat-exchange plate from the fluid-dynamic and thermodynamic point of view, with the further advantage that heat is exchanged also between the tubes 15.

Details of a preferred embodiment of the HX elements 11 are given in FIGS. 3 to 6. The inlet duct 13 and outlet duct 14 are conical tubes, with a cross section decreasing progressively from outer portions 13a, 14a to inner portions 13b, 14b. The larger outer portions 13a, 14a are located at the diverging ends of the radially-arranged elements 11, while the smaller portions 13b and 14b are located at the converging ends of elements 11, near the axis A-A. The inlet duct 13 is connected to a boiling feed water inlet 16 and the outlet duct 14 is connected to a water/steam outlet 17. The inlets and outlets of the elements 11 are connected to distributing and collecting pipes inside the reactor 1, according to known technique.

The opposite ends of tubes 15 are welded to the ducts 13, 14; fluid communication is provided by holes 18 of said ducts, for the passage of the heat-exchange medium (FIG. 4).

The tubes 15 and, hence, the channels 12, have an elongated cross section with a major axis 20 and a minor axis 21 in a plane perpendicular to A-A. FIG. 5 is an example of a suitable cross section. Preferably the ratio between the major axis and minor axis is at least 1.5 and more preferably is 3 or greater.

The tubes 15 of each element 11 are arranged so that the orientation of the cross-section major axis 20, relative to the radial coordinate r inside the reactor 1, differs from inner region Qi to the outer region Qo of the reaction space Q. The tubes 15 located in the inner region Qi, closer to axis A-A, are disposed with the major axis 20 substantially parallel to r, while tubes 15 located near the shell 2 are disposed with said axis 20 forming a given angle with the radial direction r, preferably at least 30° and more preferably equal or close to 90°.

In the example of FIG. 6, each HX element 11 comprises: a first inner subset S1 of tubes 15, near the axis A-A, disposed with the major axis 20 parallel to the radial direction r; an intermediate subset S2 of tubes 15, disposed with the major axis 20 forming a 45° angle with the radial direction r, an outer subset S3 of tubes 15, disposed with the major axis 20 forming a 90° angle with the radial direction r. In a simplified embodiment, the element 11 comprises two subsets of tubes, namely an inner subset of tubes, preferably having the major axis 20 parallel to radial direction r, and an outer subset of tubes preferably having the major axis 20 perpendicular to the same direction.

In further embodiments, more tube subsets are provided in each element 11, e.g. with major axis 20 at 0-30-45-60 and 90° relative to r, from inner to outer of the reaction space Q. The tube subsets can comprise any number of tubes 15, including a single tube. Hence, the invention can be realized with each tube 15 of the element 11 having a respective angle between the cross-section major axis 20 and the radial direction r, said angle increasing from inner to outer of the reaction space Q.

All the HX elements 11 have the same orientation of the tubes, so that the heat exchanger 10 has concentric rows of tubes 15, each row having a given tube orientation relative to r. Hence, there is an inner region of the reaction space Q where the elongated tubes 15 are aligned with the radius of the reactor, and outer regions of the same reaction space where the tubes 15 are progressively more rotated, i.e. the cross-section major axis forms a greater angle with r.

Figure 7:
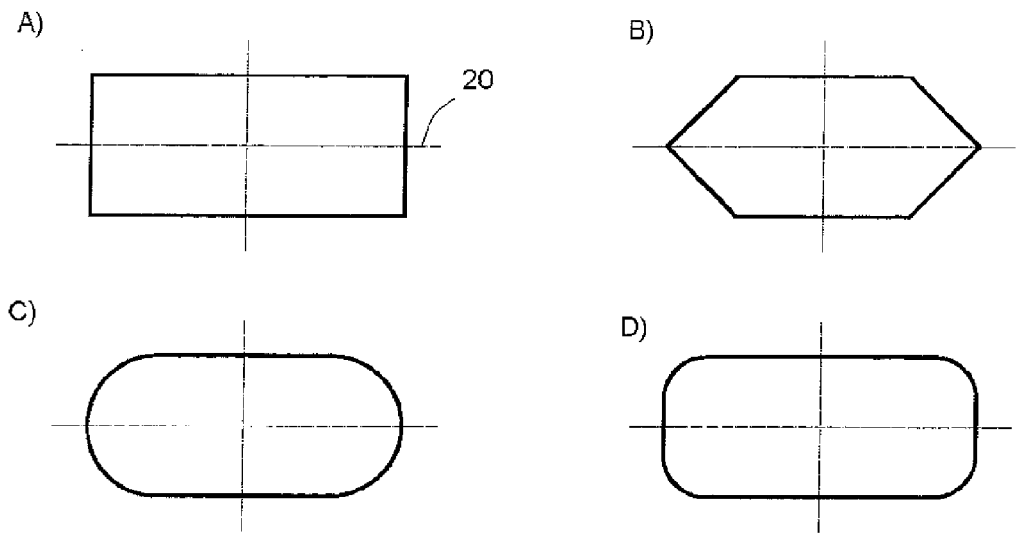
FIG. 7 shows some tube cross sections alternative to that of FIG. 5.

A non-exhaustive list of alternative cross-sections for channels 12 is shown in FIG. 7. The section of channels 12 can be rectangular (A), polygonal (B), elliptical or quasi-elliptical (C), rounded rectangular (D) and so on. The section of FIG. 7 c) is preferred for uniform heat exchange; the others however can be considered especially for reducing costs.

Figure 8:
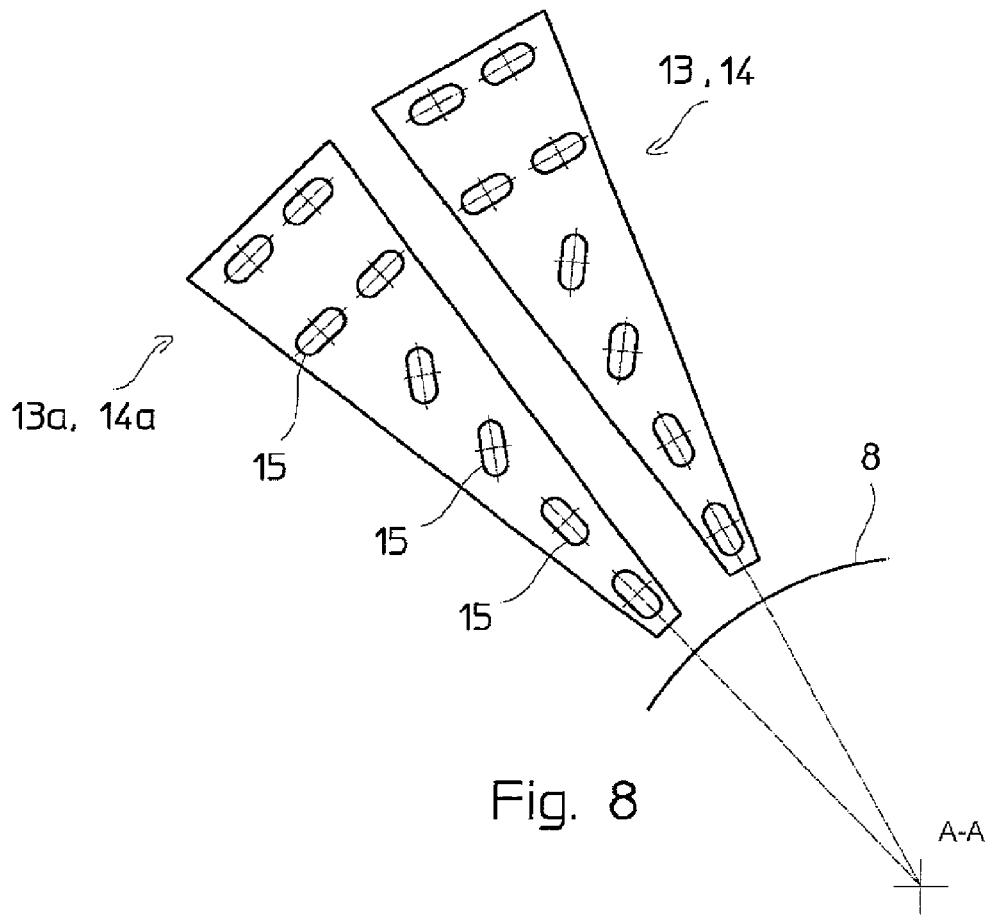
FIG. 8 is a scheme of a further embodiment of the invention, in relation of the feeding and collecting pipes of the heat exchange elements.

FIG. 8 relates to still another embodiment, where the ducts 13 and 14 are realized substantially as angular segments of a tube sheet, thus having a greater width at the outer portions 13a, 14a. Said wider portions 13a and 14a are adapted to support a plurality (at least two) of tubes 15 in a side-by-side arrangement: the related advantage is that more tubes and then more heat-exchange surface is made available in the outer portion Qo of the reaction space Q.

Figure 9:
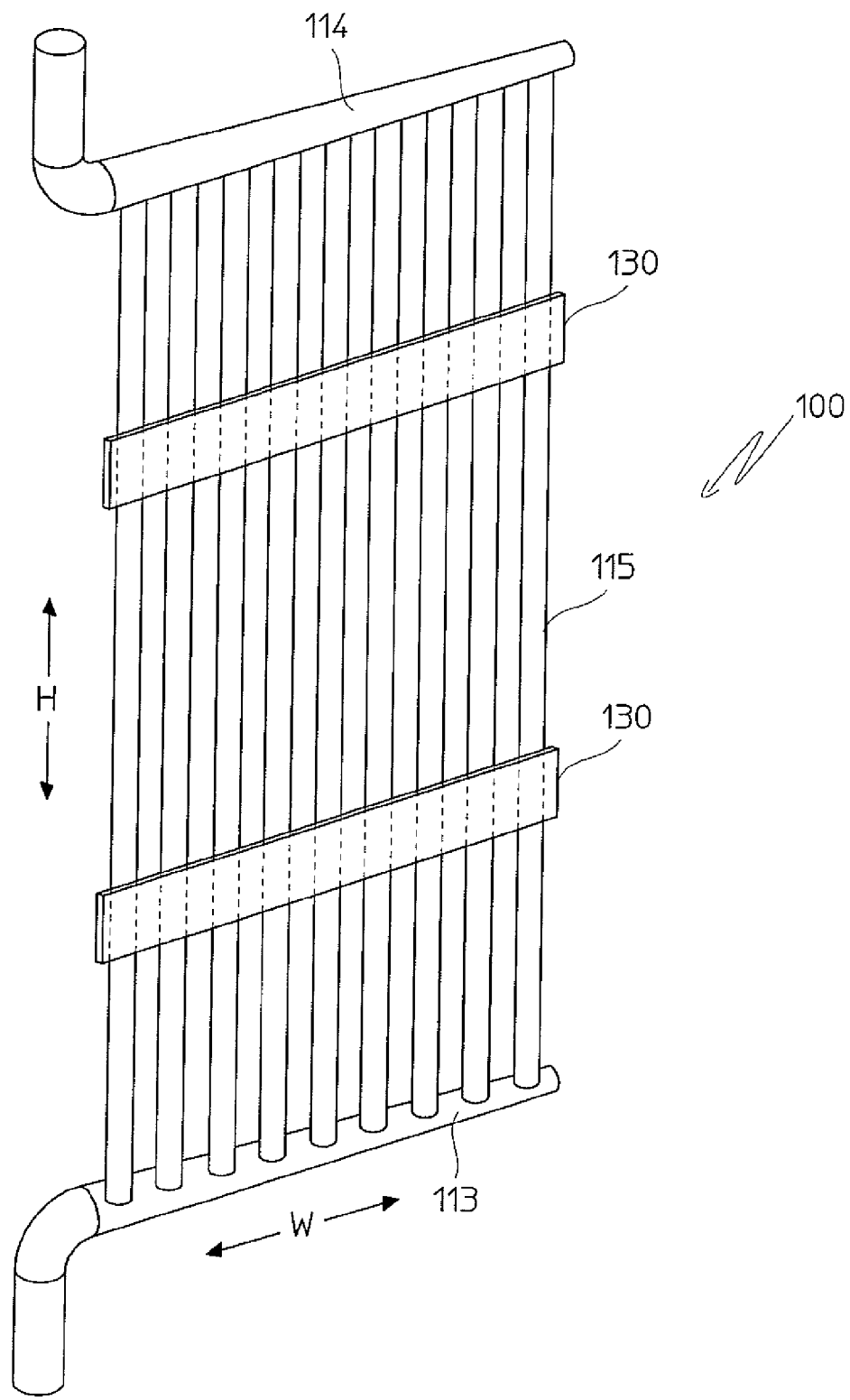
FIG. 9 is a view of a heat exchange element according to another aspect of the invention.

Referring to FIG. 9, a plate-like heat exchange element 100 according to a further aspect of the invention has an overall width W and height H, and comprises a conical feeding pipe 113 and a conical collecting pipe 114 for a heat exchange medium, said pipes forming a top and bottom side of the element 100 and having a cross section decreasing along said width direction W. The element 100 further comprises tubes 115 for a heat exchange medium, the tubes 115 being supported between said feeding pipe and collecting pipe, aligned in said width direction W and having opposite ends fixed to and in fluid communication with the feeding pipe and collecting pipe respectively. The tubes 115, in a simplified embodiment, have a circular cross section. The element 100 is also fitted with reinforcing bars 130, distributed at suitable intervals along the height H which is usually greater than width W.

Said plate-like element 100 is efficient and cost-competitive in relation to conventional plates such as the swelled plates, for example. As the reactants and products can also circulate between the tubes 115, the plate-like element 100 provides more heat exchange surface than a conventional plate having the same dimensions W, H.

The invention is equally advantageous in axial-flow, radial-flow or axial/radial isothermal chemical reactors. Referring to FIG. 1, for example, in axial-flow regime the reagents and products pass through the reaction space in a direction parallel to A-A. The invention is also applicable to any reactor with an internal heat exchanger which operates immersed in a fluid.

The invention claimed is:

1. An isothermal chemical reactor comprising a substantially cylindrical shell and providing a substantially annular reaction space, the reactor comprising a heat exchanger disposed in said reaction space and comprising an array of radially-arranged heat exchange elements around a central axis of the reactor, where each of said heat exchange elements is extended in a radial direction through said reaction space, and each of the heat exchange elements comprises a plurality of channels for a heating or cooling fluid, the channels being substantially parallel to said axis of the reactor, wherein:
   said channels have an elongated cross section with a major axis and a minor axis on a plane perpendicular to said axis of the reactor;
   each of said heat exchange elements has at least a first subset of channel(s) located in an inner region of the reaction space and arranged with the major axis forming a first angle greater or equal to 0° with said radial direction, and at least a second subset of channel(s) located in an outer region of the reaction space and arranged with the major axis forming a second angle with said radial direction, said second angle being greater than said first angle.

2. The reactor according to claim 1, wherein said first angle is 0 to 15° and said second angle is in the range 30° to 90°.

3. The reactor according to claim 1, wherein each of the heat exchange elements comprises at least one intermediate subset(s) of channel(s) between said first subset and said at least a second subset, wherein the channel(s) of said intermediate subset(s) are disposed with the major axis forming an intermediate angle, in the range between said first angle and second angle, with said radial direction.

4. The reactor according to claim 3, wherein each of said heat exchange elements comprises:
   the first inner subset S1 of channels, disposed with the major axis parallel to radial direction of the reactor;
   said at least one intermediate subset of channels disposed with the major axis forming an angle between 30° and 60° with said radial direction;
   the outer subset of channels disposed with the major axis forming a 90° angle with said radial direction.

5. The reactor according to claim 1, wherein said channels of the heat exchange elements are formed by tubes having an elongated cross section.

6. The reactor according to claim 5, wherein each of the heat exchange elements comprises a feeding duct and a collecting duct for a heat exchange medium, said ducts forming an upper side and a lower side of the heat exchange element, and said tubes having the opposite ends fixed to the feeding duct and to the collecting duct, respectively.

7. The reactor according to claim 6, wherein said feeding duct and said collecting duct of each heat exchange element have a cross section decreasing from outer ends lying on an outer circumference of the annular heat exchanger, to inner ends lying an inner circumference of the heat exchanger.

8. The reactor according to claim 7, wherein said feeding duct and said collecting duct have a substantially triangular or trapezoidal shape with a wider portion where two or more outer tubes are supported side by side so as to increase the available heat exchange surface.

9. The reactor according to claim 1, the reactor being a methanol converter.

10. A plate-like heat exchange element, having an overall width and height and comprising at least a feeding duct and a collecting duct for a heat exchange medium, said ducts being disposed in the width direction of the element and forming opposite sides of the plate-like element, and a plurality of parallel tubes defining channels for a heat exchange medium, the tubes extending in the height direction and having opposite ends in fluid communication with the feeding duct and collecting duct respectively, wherein:
   said tubes have an elongated cross section with a major axis and a minor axis;
   the heat exchange element comprises at least a first subset of consecutive tubes arranged with the major axis forming a first angle greater or equal to 0° with said width direction, and at least another subset of consecutive tubes arranged with the major axis forming a second and greater angle with said width direction.

11. A heat exchanger suitable for use in a isothermal chemical reactor, having an annular structure and comprising heat exchange elements according to claim 10, said heat exchange elements being disposed in a radial arrangement to form said annular structure.

* * * * *